(12) United States Patent
Schreiber (10) Patent No.: US 11,441,828 B2
(45) Date of Patent: *Sep. 13, 2022

(54) METHOD FOR OPERATING A CHILLER

(71) Applicant: Johnson Controls Technology Company, Auburn Hills, MI (US)

(72) Inventor: Jeb W. Schreiber, Stewartstown, PA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/141,952

(22) Filed: Jan. 5, 2021

(65) Prior Publication Data

US 2021/0123648 A1   Apr. 29, 2021

Related U.S. Application Data

(63) Continuation of application No. 16/598,543, filed on Oct. 10, 2019, now Pat. No. 10,883,749, which is a
(Continued)

(51) Int. Cl.
*F25B 49/02* (2006.01)
*F25B 1/02* (2006.01)
(Continued)

(52) U.S. Cl.
CPC ............. *F25B 49/022* (2013.01); *F25B 1/02* (2013.01); *F25B 1/04* (2013.01); *F25B 13/00* (2013.01);
(Continued)

(58) Field of Classification Search
CPC .... F25B 25/005; F25B 49/022; F25B 49/025; F25B 2339/047; F25B 2600/0253;
(Continued)

(56) References Cited

U.S. PATENT DOCUMENTS 2,267,607 A * 12/1941 Harvey .................. F25B 49/02
                                                         62/209
3,555,251 A    1/1971 Shavit
(Continued)

FOREIGN PATENT DOCUMENTS

CN    101821506 A    9/2010
CN    102037293 A    4/2011
(Continued)

OTHER PUBLICATIONS

European Office Action for EP Application No. 15710029.8, dated Mar. 25, 2021, 8 pgs.
(Continued)

*Primary Examiner* — Jonathan Bradford
(74) *Attorney, Agent, or Firm* — Fletcher Yoder, P.C.

(57) ABSTRACT

A method of operating a chiller having a closed refrigerant loop including a compressor, a condenser and an evaporator. The refrigerant used in the loop defining a pressure-enthalpy curve representative of different phases (vapor, liquid and vapor, and liquid) of the refrigerant at different combinations of pressure and enthalpy. The loop defining a process cycle (compression, condensation, expansion, and evaporation) of the refrigerant during operation of the loop relative to the pressure-enthalpy curve of the refrigerant. The method including continuously operating the compressor when a segment of the process cycle corresponds to the refrigerant being in the liquid phase.

20 Claims, 8 Drawing Sheets

Related U.S. Application Data continuation of application No. 15/304,042, filed as application No. PCT/US2015/016734 on Feb. 20, 2015, now Pat. No. 10,451,326.

(60) Provisional application No. 61/980,088, filed on Apr. 16, 2014.

(51) Int. Cl.
*F25B 25/00* (2006.01)
*F25B 1/04* (2006.01)
*F25B 13/00* (2006.01)

(52) U.S. Cl.
CPC .......... *F25B 25/005* (2013.01); *F25B 49/025* (2013.01); *F25B 2313/003* (2013.01); *F25B 2313/004* (2013.01); *F25B 2339/047* (2013.01); *F25B 2600/0253* (2013.01); *F25B 2700/21161* (2013.01); *F25B 2700/21173* (2013.01); *Y02B 30/70* (2013.01)

(58) Field of Classification Search
CPC .......... F25B 2700/195; F25B 2700/197; F25B 2700/2116; F25B 2700/21161; F25B 2700/21173
See application file for complete search history.

(56) References Cited

U.S. PATENT DOCUMENTS

| | | |
|---|---|---|
| 3,744,264 A | 7/1973 | Ware |
| 4,483,152 A | 11/1984 | Bitondo |
| 5,477,696 A | 12/1995 | Takahata et al. |
| 5,857,348 A | 1/1999 | Conry |
| 6,085,532 A | 7/2000 | Sibik |
| 6,460,355 B1 | 10/2002 | Trieskey |
| 6,463,748 B1 | 10/2002 | Benedict et al. |
| 10,883,749 B2 * | 1/2021 | Schreiber ................ F25B 1/02 |
| 2002/0184905 A1 | 12/2002 | Benedict et al. |
| 2005/0144965 A1 | 7/2005 | Ueda et al. |
| 2009/0210096 A1 | 8/2009 | Stack et al. |
| 2010/0070082 A1 | 3/2010 | Chessel et al. |
| 2010/0319395 A1 | 12/2010 | de Larminat et al. |
| 2012/0118530 A1 | 5/2012 | Yamashita et al. |

FOREIGN PATENT DOCUMENTS

| | | |
|---|---|---|
| CN | 203053077 U | 7/2013 |
| JP | 10-009695 A | 1/1998 |
| JP | 2000-297797 A | 10/2000 |
| JP | 2005-519214 A | 6/2005 |
| JP | 2006-057932 A | 3/2006 |
| JP | 3985092 B2 | 10/2007 |
| JP | 2011-012904 A | 1/2011 |
| JP | 2011-017455 A | 1/2011 |
| JP | 2011-038711 A | 2/2011 |
| JP | 2012-149782 A | 8/2012 |
| JP | 2012-229823 A | 11/2012 |
| JP | 2013-238325 A | 11/2013 |
| JP | 2014-102019 A | 6/2014 |
| KR | 10-0319910 A | 1/2002 |
| KR | 10-2010-0063173 A | 6/2010 |
| WO | 2011008371 A2 | 1/2011 |
| WO | 2013165841 A1 | 11/2013 |

OTHER PUBLICATIONS

Chinese Office Action for CN Application No. 202010084454.7, dated Jun. 1, 2021, 5 pgs.

* cited by examiner

METHOD FOR OPERATING A CHILLER

CROSS REFERENCE TO RELATED APPLICATIONS

This application is a continuation of U.S. patent application Ser. No. 16/598,543, entitled "METHOD FOR OPERATING A CHILLER," filed Oct. 10, 2019, which is hereby incorporated by reference in its entirety, and which claims priority to and the benefit of U.S. patent application Ser. No. 15/304,042, entitled "METHOD FOR OPERATING A CHILLER," filed Oct. 13, 2016, which is hereby incorporated by reference in its entirety, which claims priority to and the benefit of PCT Patent Application No. PCT/US2015/016734, entitled "METHOD FOR OPERATING A CHILLER," filed Feb. 20, 2015, which is herein incorporated by reference in its entirety, and which claims priority to and benefit of U.S. Provisional Application Ser. No. 61/980,088, entitled "METHOD FOR OPERATING A CHILLER," filed Apr. 16, 2014, which is hereby incorporated by reference in its entirety.

BACKGROUND

The application relates generally to refrigeration, air conditioning and chilled liquid systems. The application relates more specifically to methods of operating refrigeration, air conditioning and chilled liquid systems.

It has been recognized that under certain environmental conditions and reduced system cooling demand conditions, chilled liquid systems using a centrifugal compressor can be operated at a fraction of the cost when compared to the cost during normal operation, sometimes referred to as "free cooling". The 2008 *ASHRAE Handbook—HVAC Systems and Equipment* (page 42.12) provides as follows:

Cooling without operating the compressor of a centrifugal liquid chiller is called free cooling. When a supply of condenser water is available at a temperature below the needed chilled-water temperature, some chillers can operate as a thermal siphon. Low-temperature condenser water condenses refrigerant, which is either drained by gravity or pumped into the evaporator. Higher-temperature chilled water causes the refrigerant to evaporate, and vapor flows back to the condenser because of the pressure difference between the evaporator and the condenser.

In other words, when the entering condenser water temperature is less than the exiting water temperature from the evaporator of a liquid centrifugal liquid chiller, and when the demand for cooling is sufficiently low such that the exiting evaporator water temperature satisfies the demand for cooling, the centrifugal compressor is shut off, resulting in substantially energy savings.

Unfortunately, such environmental conditions in numerous parts of the world relatively rarely occur, or may be brief in duration. Occurring yet more rarely is the combination of the advantageous environmental conditions that simultaneously produce sufficient cooling output to satisfy the demand for cooling, in order to permit shut-down of the centrifugal compressor.

Thus, there is a need for a method of operating a chiller that significantly increases the range of environmental conditions (e.g., increases the range of temperatures of entering condenser water temperatures and exiting evaporator water temperatures as well as the range of differences therebetween) to achieve energy savings during chiller operation. There is a further need for a method of operating a chiller in the above-referenced range of environmental conditions that increases chiller load capacity while simultaneously achieving such energy savings.

SUMMARY

The present invention relates to a method of operating a chiller having a compressor including comparing the temperature of a liquid entering a condenser (for thermal communication with refrigerant in the condenser") with a temperature of a liquid exiting an evaporator (for thermal communication with refrigerant in the evaporator). The method further includes continuously operating the compressor at least in response to each temperature range: the liquid evaporator exiting temperature being greater than the liquid condenser entering temperature by a predetermined amount; the liquid evaporator exiting temperature being substantially equal to the liquid condenser entering temperature; the liquid evaporator exiting temperature being less than the liquid condenser entering temperature by a predetermined amount.

The present invention further relates to a method of operating a chiller having a closed refrigerant loop including a compressor, a condenser and an evaporator, the refrigerant used in the loop defining a pressure-enthalpy curve representative of different phases (vapor, liquid and vapor, and liquid) of the refrigerant at different combinations of pressure and enthalpy, the loop defining a process cycle (compression, condensation, expansion, and evaporation) of the refrigerant during operation of the loop relative to the pressure-enthalpy curve of the refrigerant. The method including continuously operating the compressor when a segment of the process cycle corresponds to the refrigerant being in the liquid phase.

The present invention yet further relates to a method of operating a chiller having a centrifugal compressor including comparing the temperature of a liquid entering a condenser (for thermal communication with refrigerant in the condenser") with a temperature of a liquid exiting an evaporator (for thermal communication with refrigerant in the evaporator). The method further includes continuously operating the compressor using a VSD for controlling a rotational speed of a compressor motor, the compressor utilizing magnetic bearings, at least in response to each temperature range: the liquid evaporator exiting temperature being greater than the liquid condenser entering temperature by a predetermined amount; the liquid evaporator exiting temperature being substantially equal to the liquid condenser entering temperature; the liquid evaporator exiting temperature being less than the liquid condenser entering temperature by a predetermined amount.

DETAILED DESCRIPTION OF THE EXEMPLARY EMBODIMENTS

Figure 1:
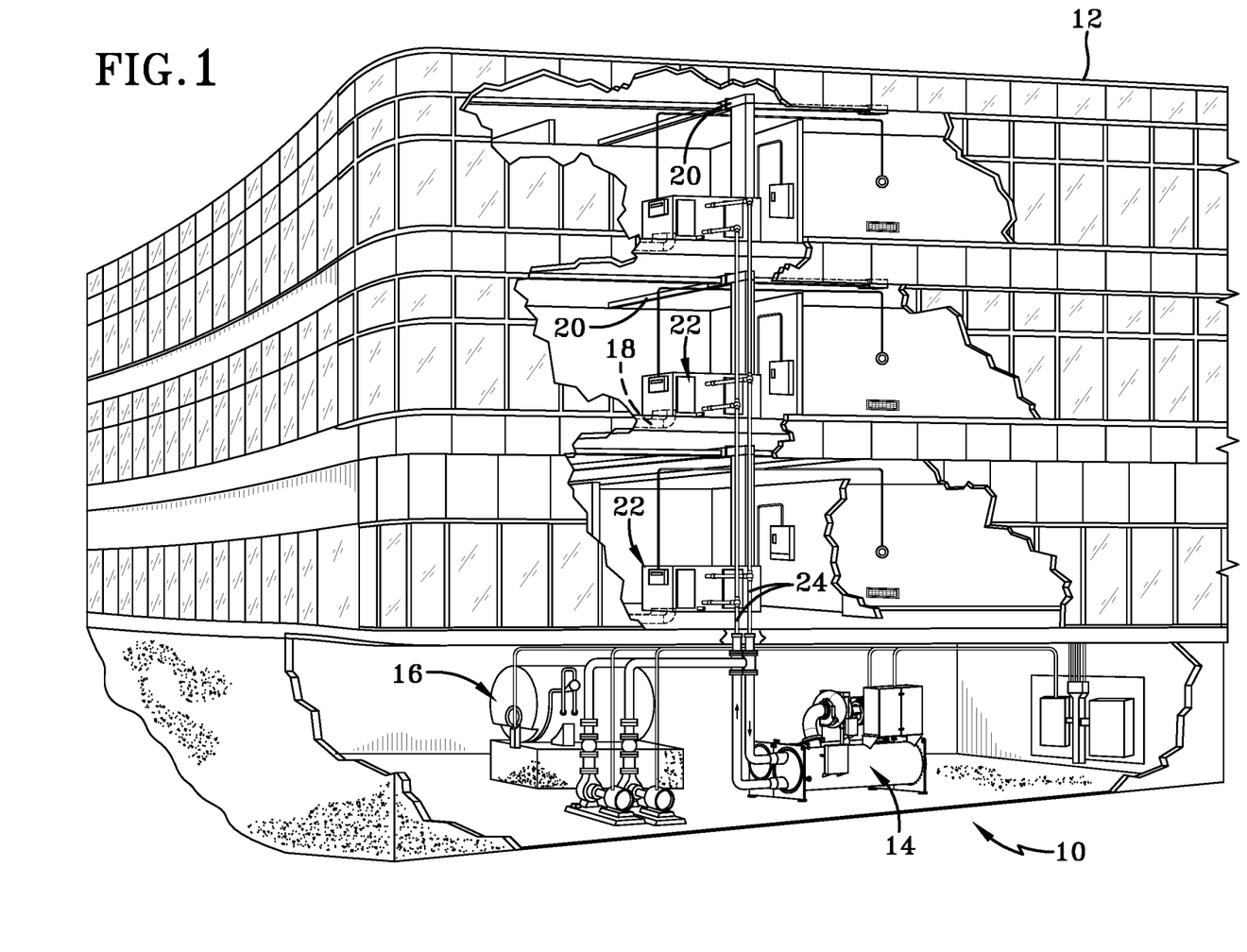
FIG. 1 shows an exemplary embodiment for a heating, ventilation and air conditioning system.

FIG. 1 shows an exemplary environment for a heating, ventilation and air conditioning (HVAC) system 10 incorporating a chilled liquid system in a building 12 for a typical commercial setting. System 10 can include a vapor compression system 14 that can supply a chilled liquid which may be used to cool building 12. System 10 can include a boiler 16 to supply heated liquid that may be used to heat building 12, and an air distribution system which circulates air through building 12. The air distribution system can also include an air return duct 18, an air supply duct 20 and an air handler 22. Air handler 22 can include a heat exchanger that is connected to boiler 16 and vapor compression system 14 by conduits 24. The heat exchanger in air handler 22 may receive either heated liquid from boiler 16 or chilled liquid from vapor compression system 14, depending on the mode of operation of system 10. System 10 is shown with a separate air handler on each floor of building 12, but it is appreciated that the components may be shared between or among floors.

Figure 2:
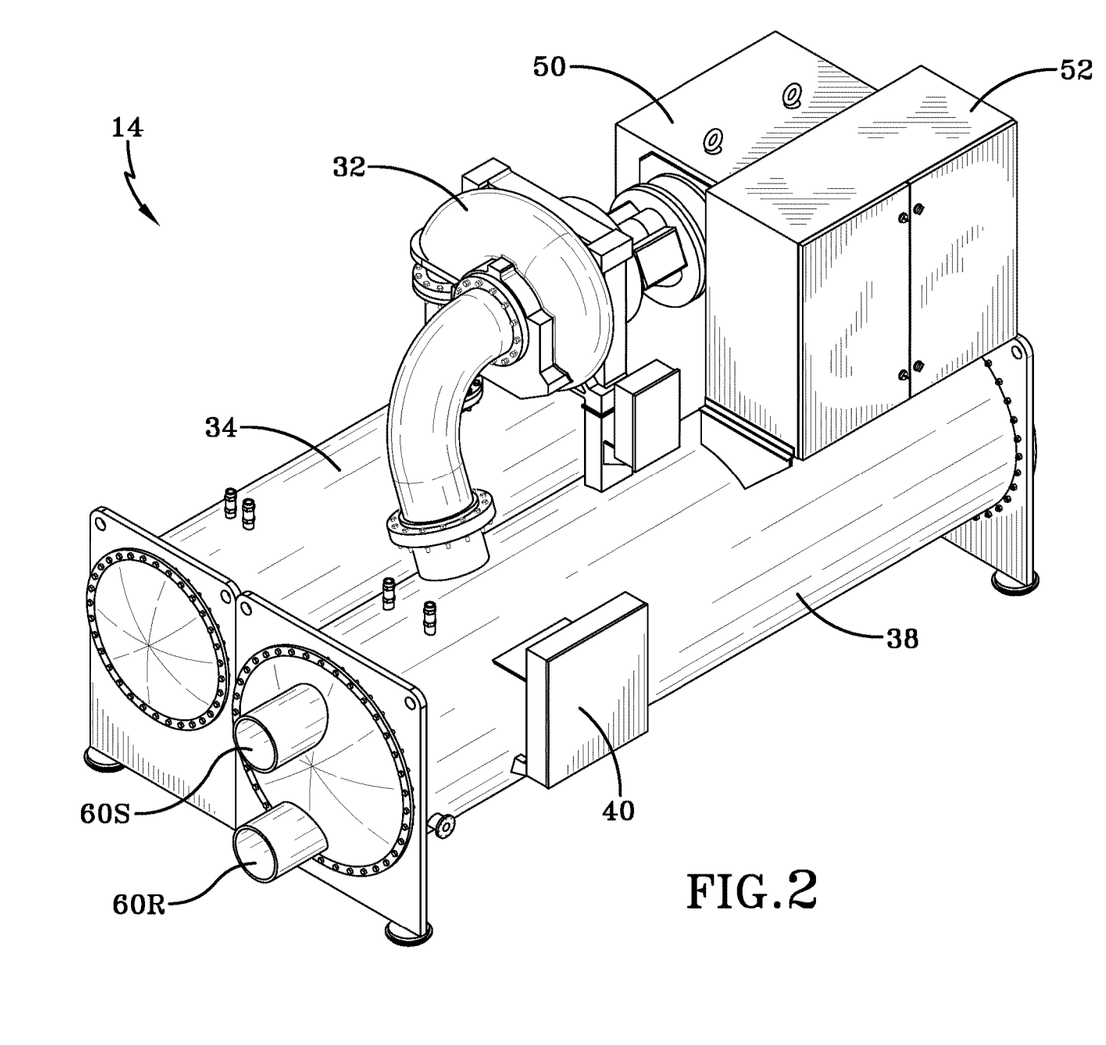
FIG. 2 shows an isometric view of an exemplary vapor compression system.
Figure 3:
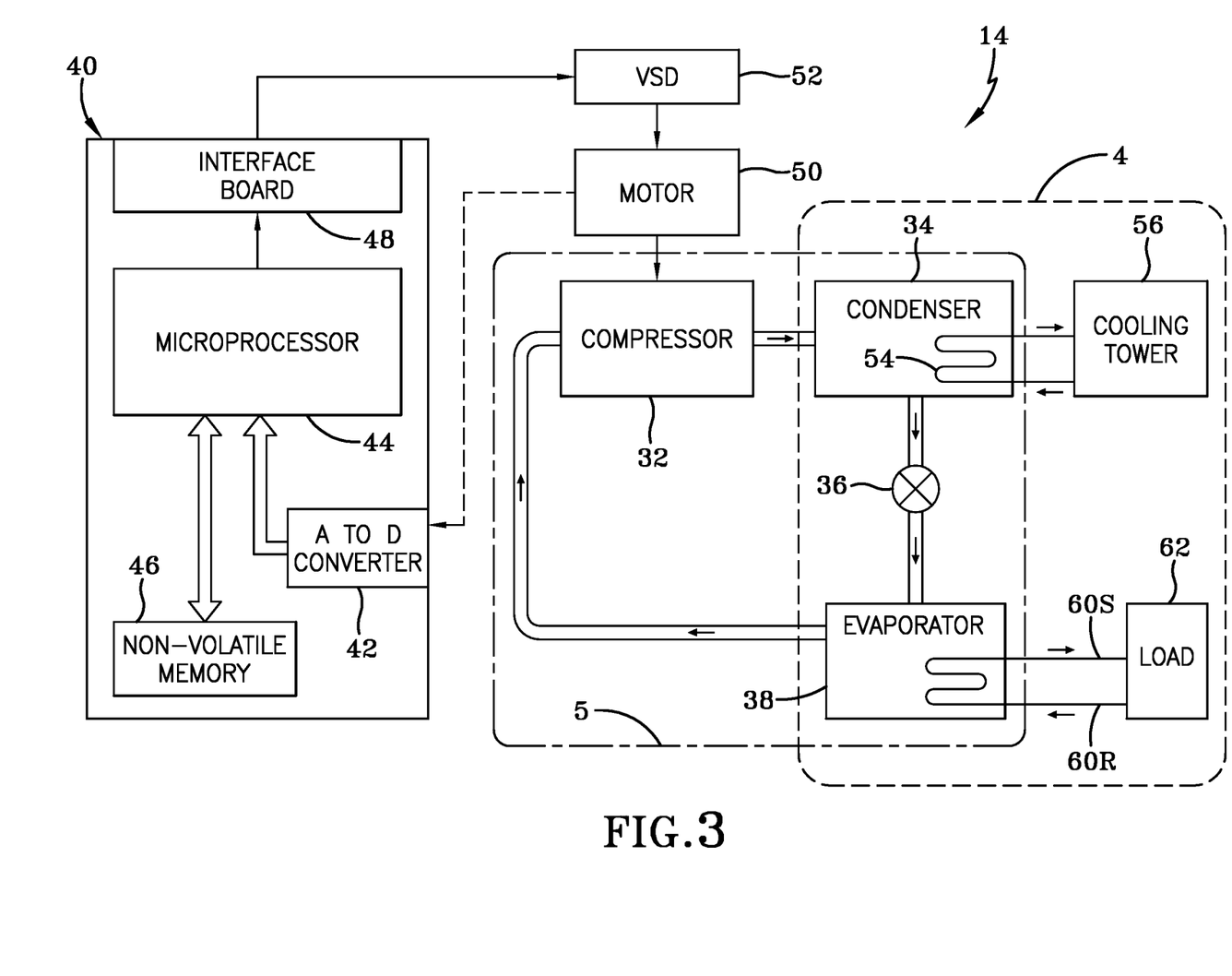
FIG. 3 schematically illustrates an exemplary embodiment of the vapor compression system.

FIGS. 2 and 3 show an exemplary vapor compression system 14 that can be used in an HVAC system, such as HVAC system 10. Vapor compression system 14 can circulate a refrigerant through a compressor 32 driven by a motor 50, a condenser 34, expansion device(s) 36, and a liquid chiller or evaporator 38. Vapor compression system 14 can also include a control panel 40 that can include an analog to digital (ND) converter 42, a microprocessor 44, a non-volatile memory 46, and an interface board 48. Some examples of fluids that may be used as refrigerants in vapor compression system 14 are hydrofluorocarbon (HFC) based refrigerants, for example, R-410A, R-407, R-134a, hydrofluoro olefin (HFO), "natural" refrigerants like ammonia (NH3), R-717, carbon dioxide (CO2), R-744, or hydrocarbon based refrigerants, water vapor or any other suitable type of refrigerant. In an exemplary embodiment, vapor compression system 14 may use one or more of each of VSDs 52, motors 50, compressors 32, condensers 34 and/or evaporators 38.

Motor 50 used with compressor 32 can be powered by a variable speed drive (VSD) 52 or can be powered directly from an alternating current (AC) or direct current (DC) power source. VSD 52, if used, receives AC power having a particular fixed line voltage and fixed line frequency from the AC power source and provides power having a variable voltage and frequency to motor 50. Motor 50 can include any type of electric motor that can be powered by a VSD or directly from an AC or DC power source. For example, motor 50 can be a switched reluctance motor, an induction motor, an electronically commutated permanent magnet motor or any other suitable motor type. In an alternate exemplary embodiment, other drive mechanisms such as steam or gas turbines or engines and associated components can be used to drive compressor 32.

Compressor 32 compresses a refrigerant vapor and delivers the vapor to condenser 34 through a discharge line. Compressor 32 can be a centrifugal compressor, screw compressor, reciprocating compressor, rotary compressor, swing link compressor, scroll compressor, turbine compressor, or any other suitable compressor. Compressor 32, as well as other rotating components of the vapor compression system, can include magnetic bearings for providing smooth rotational movement. The refrigerant vapor delivered by compressor 32 to condenser 34 transfers heat to a fluid, for example, water or air. The refrigerant vapor condenses to a refrigerant liquid in condenser 34 as a result of the heat transfer with the fluid. The liquid refrigerant from condenser 34 flows through expansion device 36 to evaporator 38. In the exemplary embodiment shown in FIG. 3, condenser 34 is water cooled and includes a tube bundle 54 connected to a cooling tower 56.

The liquid refrigerant delivered to evaporator 38 absorbs heat from another fluid, which may or may not be the same type of fluid used for condenser 34, and undergoes a phase change to a refrigerant vapor. In the exemplary embodiment shown in FIG. 3, evaporator 38 includes a tube bundle having a supply line 60S and a return line 60R connected to a load or cooling load 62. A process fluid, for example, water, ethylene glycol, propylene glycol, calcium chloride brine, sodium chloride brine, or any other suitable liquid, enters evaporator 38 via return line 60R and exits evaporator 38 via supply line 60S. Evaporator 38 chills the temperature of the process fluid in the tubes. The tube bundle in evaporator 38 can include a plurality of tubes and a plurality of tube bundles. The vapor refrigerant exits evaporator 38 and returns to compressor 32 by a suction line to complete the cycle.

Figure 4:
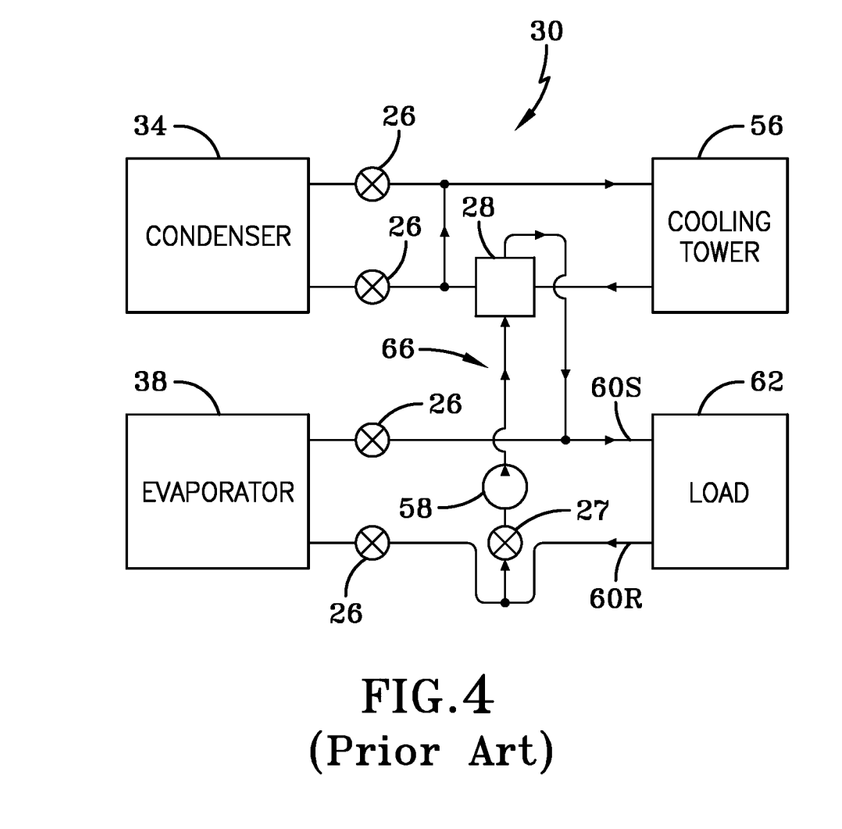
FIG. 4 schematically illustrates a prior art embodiment taken from region 4 of the vapor compression system of FIG. 3.

FIG. 4, which is taken from region 4 of FIG. 3, shows a prior art arrangement of components of a conventional vapor compression system that is configured for shut-down of a centrifugal compressor 32 (FIG. 3) during free cooling conditions, as previously discussed. As previously disclosed in the ASHRAE Handbook, only conventional vapor compression systems using centrifugal compressors were identified for use during free cooling conditions. As further shown in FIG. 4, a valve 26 is positioned in fluid communication with each of the pair of lines extending between condenser 34 and cooling tower 56. Similarly, a valve 26 is positioned in fluid communication with each of return line 60R and supply line 60S extending between evaporator 38 and load or cooling load 62. In response to a free cooling condition, each of valves 26 are closed, preventing the flow of fluid from cooling tower 56 to condenser 34 and the flow of fluid from load or cooling load 62 to evaporator 38. As a result, a heat exchanger 28, sometimes referred to as a water side economizer, originally positioned between condenser 34 and cooling tower 56, is now positioned in fluid communication with a closed cooling tower loop 30 that is in thermal communication with water from a closed cooling load loop 66. The water in closed cooling load loop 66 is moved by a pump 58 that is in fluid communication with closed cooling load loop 66. During free cooling conditions, a valve 27 is opened, such that pump 58 is in fluid communication with closed cooling load loop 66.

Figure 5:
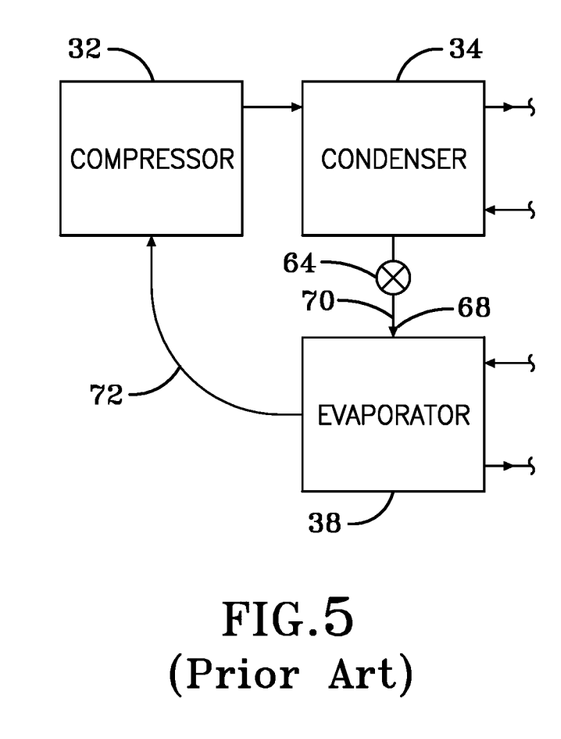
FIG. 5 schematically illustrates a prior art embodiment taken from region 4 of the vapor compression system of FIG. 3.
Figure 9:
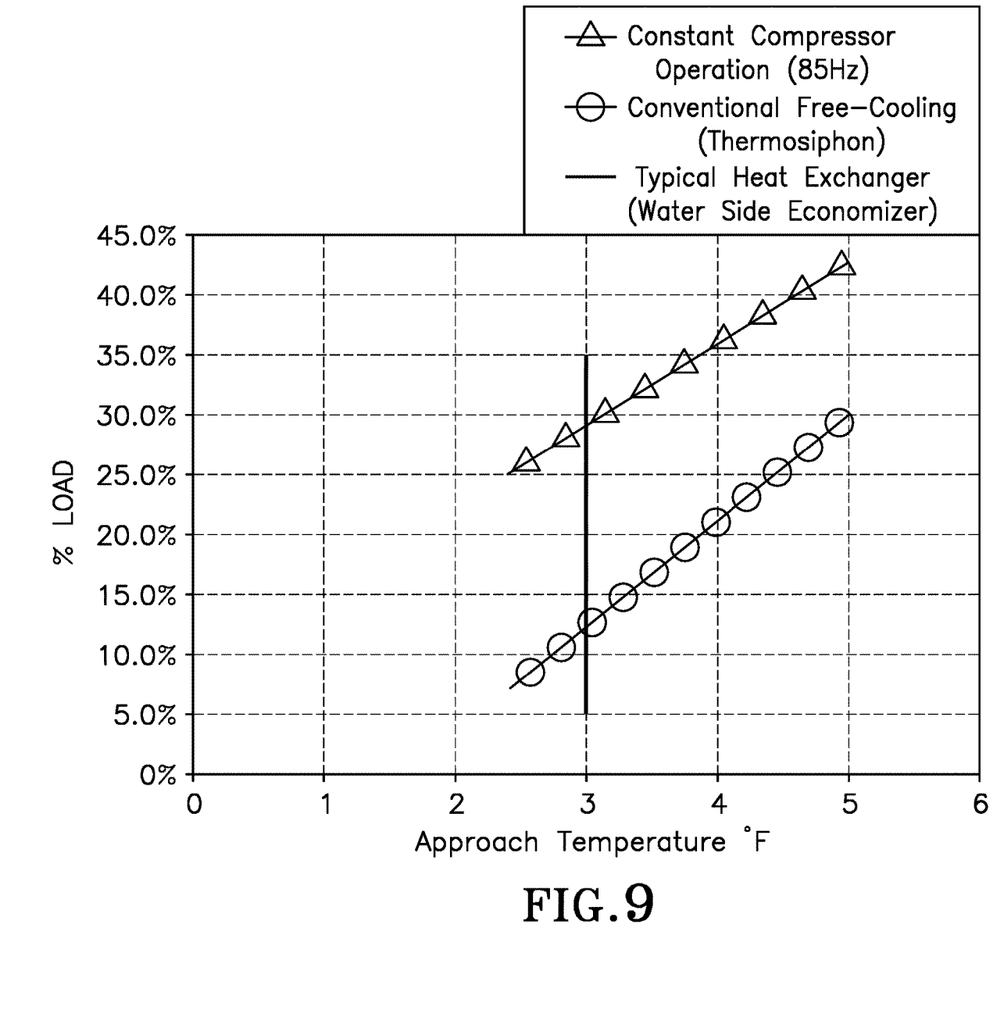
FIG. 9 graphically illustrates a range of load capacity percentages versus a range of approach temperatures of the exemplary vapor compression system.

FIG. 5, which is taken from region 5 of FIG. 3, shows refrigerant flow of a prior art conventional vapor compression system that is configured for shut-down of centrifugal compressor 32 (FIG. 3) during free cooling conditions, as previously discussed, except with the difference that in FIG. 4, valve 27 is closed and valves 26 remain open. Upon shut-down of compressor 32 (FIG. 3), refrigerant in evaporator 38 has a natural tendency to migrate to condenser 34, which typically operates at a temperature that is less than the temperature of evaporator 38. Once liquid refrigerant migration from evaporator 38 to condenser 34 has occurred, and the pressures between condenser 34 and evaporator 38 have equalized, by virtue of condenser 34 being positioned vertically above evaporator 38, liquid refrigerant begins to flow in a flow direction 68 along line 70 toward evaporator 38, as a result of thermo siphoning. Upon the liquid refrigerant reaching evaporator 38, due to the temperature in an evaporator 38 being greater than the temperature in condenser 34, an amount of liquid refrigerant in evaporator 38 "boils" or is changed to vapor refrigerant that moves in flow direction 72 that is removed from evaporator 38. Once vapor refrigerant is removed, additional liquid refrigerant is then drawn into evaporator 38 as a result of thermo siphoning, and the process is repeated. While thermo siphoning results in movement of an amount of refrigerant through the evaporator without operating the centrifugal compressor, the flow rate of refrigerant through the evaporator is significantly less when compared with the flow rate that would normally occur during compressor operation, thereby limiting the amount of cooling capacity available to satisfy the demand for cooling. For example, as will be discussed in further detail below, a conventional centrifugal liquid chiller, when operating in a free cooling condition or mode can generally only accommodate approximately 12 percent of cooling load demand (% Load) when operating at an approach temperature of 3° F. (liquid evaporator exiting temperature subtracted from the liquid condenser) (FIG. 9).

However, in an exemplary method of the present disclosure, vapor compression system 14 (FIG. 3) operates differently than a conventional centrifugal liquid chiller during free cooling. That is, instead of shutting-off a conventional centrifugal liquid chiller operating during free cooling conditions, the compressor of the exemplary vapor compressor system of the present disclosure continues to operate at all environmental conditions (that is, environmental conditions which are safe to operate a vapor compression system).

Figure 6:
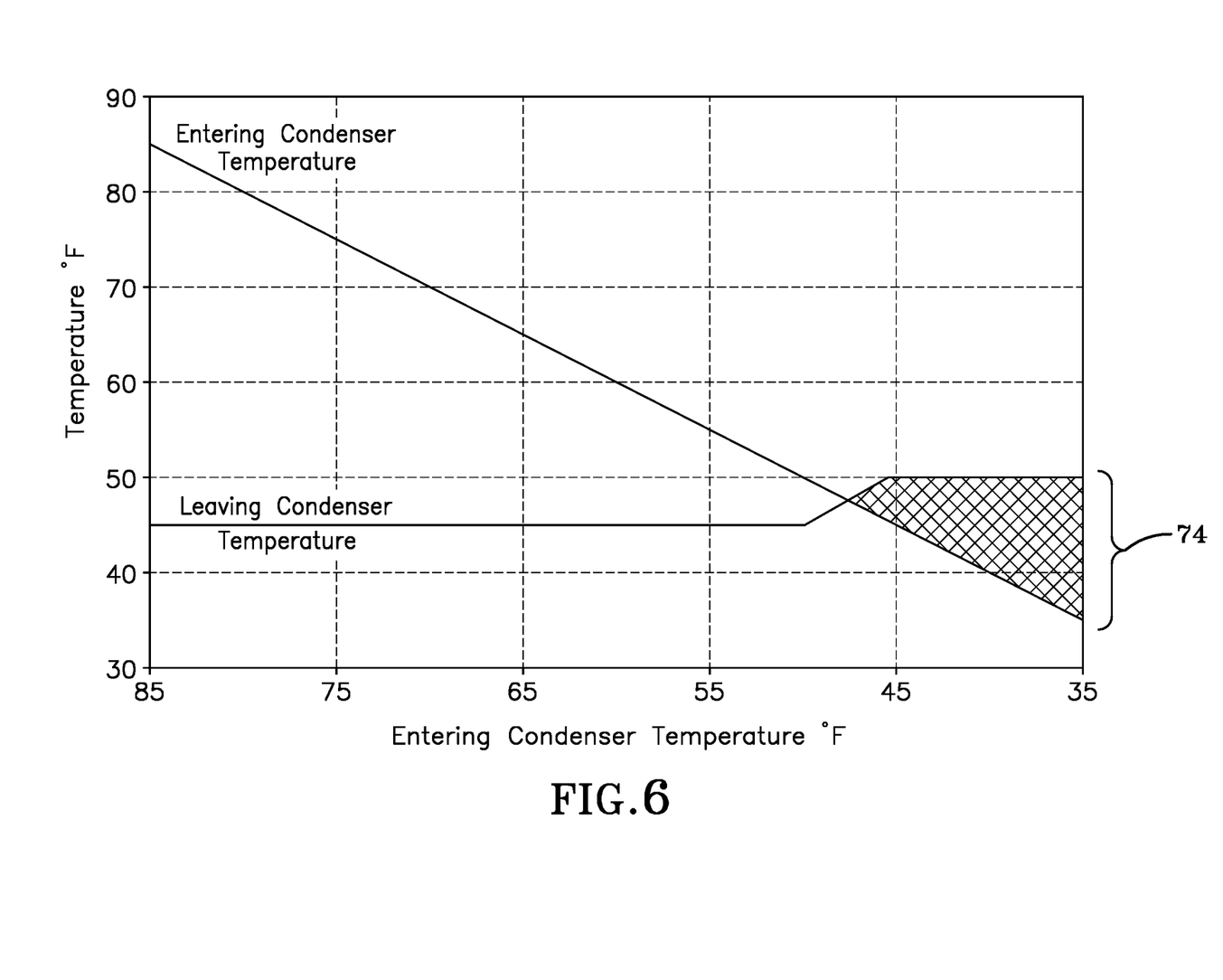
FIG. 6 graphically illustrates a range of entering condenser temperatures and leaving evaporator temperatures of an exemplary vapor compression system.

For example, in one exemplary method of operating a chiller having a compressor, while comparing the temperature of a liquid entering a condenser (for thermal communication with refrigerant in the condenser") with a temperature of a liquid exiting an evaporator (for thermal communication with refrigerant in the evaporator), the compressor is continuously operating at least in response to at least each temperature range identified herein. These temperature ranges comprise the liquid evaporator exiting temperature being greater than the liquid condenser entering temperature by a predetermined amount, which difference in temperatures (liquid evaporator exiting temperature subtracted from the liquid condenser) sometimes referred to as an approach temperature. In one embodiment, the predetermined amount (approach temperature) is about 3° F. In another embodiment, the predetermined amount (approach temperature) is greater than 3° F. In another embodiment, the predetermined amount (approach temperature) is between about 3° F. and about 5° F. For example, a user may determine that the temperature difference be up to about 5° F. in one embodiment, or greater than 5° F., such as between about 5° F. and about 10° F. in another embodiment. In yet another embodiment, the user may determine that the temperature difference be greater than 10° F. FIG. 6 shows a temperature difference 74 (cross-hatched region) in which the leaving evaporator temperature is greater than the entering condenser temperature in amounts ranging from zero to about 15° F. It is to be understood by those skilled in the art that as the approach temperature increases, the amount of cooling load demand (% Load) that can be accommodated by the chiller increases (see FIG. 9).

These temperature ranges also comprise the liquid evaporator exiting temperature being substantially equal to the liquid condenser entering temperature. These temperature ranges also comprise the liquid evaporator exiting temperature being less than the liquid condenser entering temperature by a predetermined amount. For example, in certain applications and/or temperature ranges of entering condenser temperatures and leaving evaporator temperatures, the user may select an increased temperature difference, if the amount of cooling load demand (sometimes referred to as % Load) is generally low enough to be accommodated by the chiller. The chiller cooling capacity is decreased in response to an increased difference between the liquid evaporator exiting temperature and the liquid condenser entering temperature, when the liquid evaporator exiting temperature is less than the liquid condenser entering temperature.

These temperature ranges also comprise the liquid evaporator exiting temperature fluctuating in response to a change in demand for chiller cooling.

Figure 7:
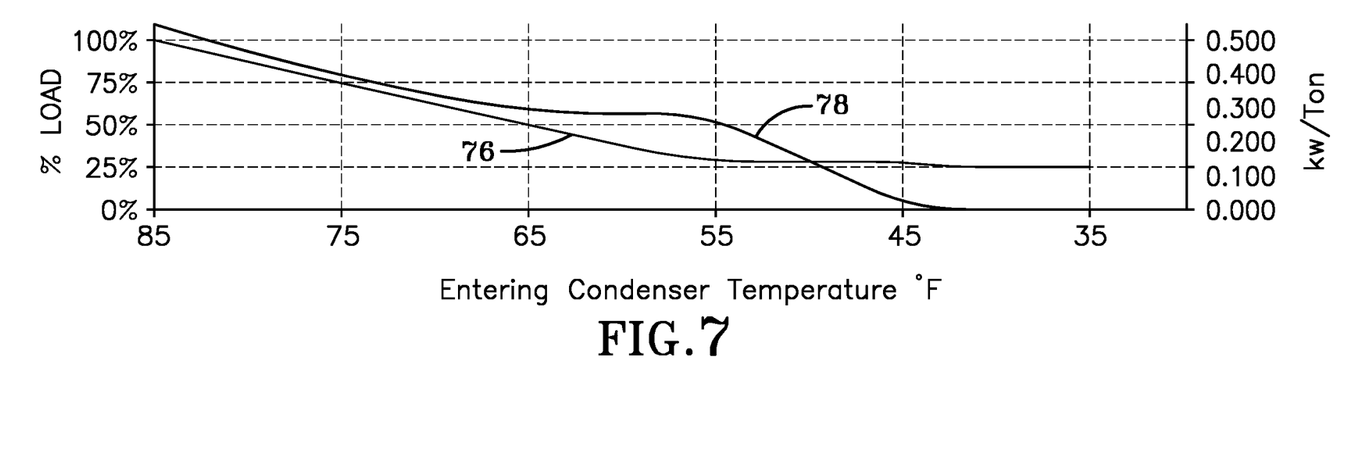
FIG. 7 graphically illustrates energy costs over a range of load capacity percentages versus a range of entering condenser temperatures of an exemplary vapor compression system.

There are several advantages to continuously operating the compressor in response to all environmental conditions (within which are safe to operate a vapor compression system). First, as previously discussed, the temperature range (and accordingly, the probability of favorable environmental conditions) at which increased chiller operating efficiencies are available is significantly increased. Second, while providing continuous compressor operation requires power, such as electrical power, the amount of power required is minimized, due to the increased chiller operating efficiencies associated with the significantly enlarged range of temperatures associated with favorable environmental conditions. For example, FIG. 7 shows a performance curve 76 depicting a cooling capacity percentage (% Load) over a range of entering condenser temperatures, and a performance curve 78 depicting the energy required per unit of cooling (kW/Ton) of a liquid chiller over the same range of entering condenser temperatures.

Figure 8:
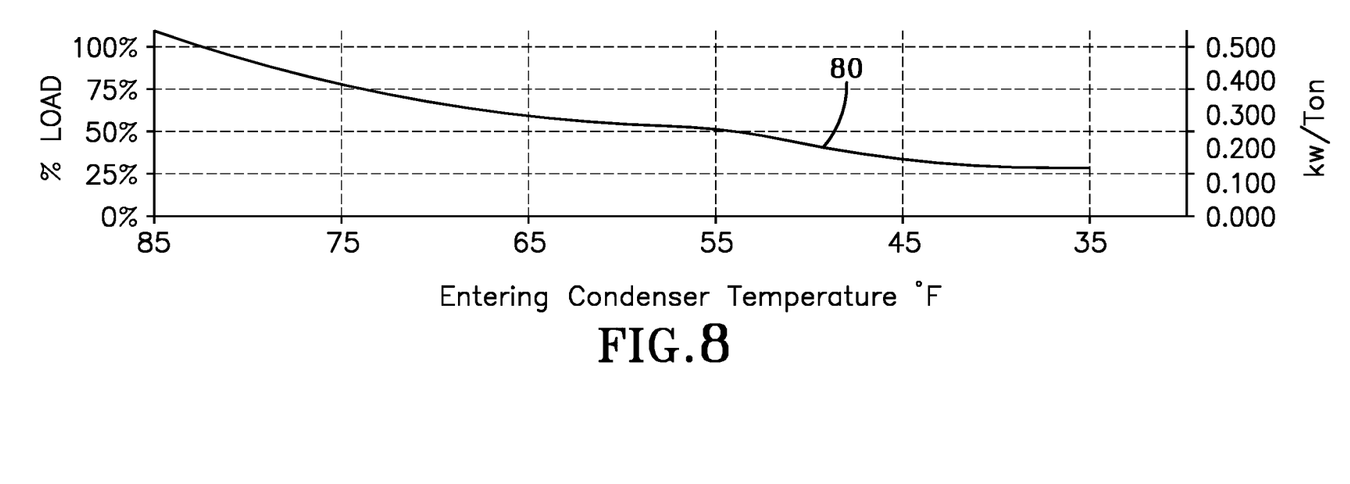
FIG. 8 graphically illustrates energy costs over a range of load capacity percentages versus a range of entering condenser temperatures of an exemplary vapor compression system.

In one embodiment, the compressor operates at or about a minimum rotational speed ("speed"), such as a minimal operating speed of VSD 52 (FIG. 3) such as for rotatably driving compressor motor 50. In one embodiment of a centrifugal compressor, a minimum operating speed of a VSD can be about 85 Hz. In other embodiments of centrifugal compressors, a minimum operating speed of a VSD may be significantly different than 85 Hz. In addition, differences in minimum operating VSD speeds can result because the vapor compression systems of the present disclosure are not limited to centrifugal compressors, but can include positive displacement compressors, including but not limited to reciprocating, rotary, swing link, scroll, and screw compressors, which may operate at different minimum speeds. In one embodiment, for circumstances in which operating the compressor at a minimal speed provides an insufficient amount of cooling capacity to satisfy the demand for cooling, the operating speed of the VSD would be increased, thereby increasing both the compressor speed and cooling capacity until a sufficient amount of cooling capacity is provided to satisfy the cooling demand. However, as shown in performance curve 80 of FIG. 8, if the chiller must operate at design cooling capacity (100% LOAD), the amount of energy per unit of cooling (kW/Ton) increases with correspondingly increasing entering condenser water temperatures, such as with performance curve 80, when compared to performance curve 78 (FIG. 7) at the same environmental conditions and reduced cooling capacity.

In another embodiment, for circumstances in which operating the compressor at a minimal speed provides an insufficient amount of cooling capacity to satisfy the demand for cooling, the operating speed of the VSD would continue to operate at the same minimum speed. In other words, in this embodiment, the flow rate of water entering the evaporator and temperature of water exiting the evaporator dictates the amount of cooling available. As a result, an operator would be required to establish operating constraints associated with favorable environmental conditions associated with increased chiller operating efficiencies. Stated another way, the operator would need to control their system such that the water temperature exiting the evaporator, at a given flow rate, satisfies the cooling demand.

Third, by virtue of continued operation of the compressor of a chiller, a change in pressure is maintained in a suction line to the compressor 32 (FIG. 3), thereby resulting in drawing liquid refrigerant from condenser 34 to evaporator 38, without thermal siphoning. In one embodiment of evaporator 38, such as a falling film evaporator or hybrid falling film evaporator such as disclosed, for example in Applicant's U.S. patent application Ser. No. 12/746,858 entitled "Heat Exchanger", which is incorporated by reference in its entirety, liquid refrigerant in the evaporator cannot easily move between the condenser and the evaporator during shut-down of the compressor. As a result of the change in pressure due to continued compressor operation, which occurs even at a minimum compressor speed, liquid refrigerant is pushed from the condenser and provided to the evaporator, permitting different positioning orientations of the evaporator relative to the condenser. Chillers needing to utilize thermal siphoning without a pump are constrained to positioning the condenser vertically above the evaporator, as well as other plumbing constraints in order for thermal siphoning to occur.

Fourth, as shown in FIG. 9, for a given approach temperature, while operating in a free cooling condition or mode (for purposes of providing a direct comparison with a conventional system constrained to operate in a free cooling condition), a liquid chiller continuously operating the compressor at a minimum speed, for example 85 Hz., provides nearly twice the design cooling capacity (% Load) when compared to a conventional centrifugal compressor utilizing thermal siphoning (e.g., FIG. 5). Also shown in FIG. 9 is a range of design cooling capacity (% Load) for a typical heat exchanger 28 (FIG. 4), sometimes referred to as a water side economizer, operating with closed cooling tower loop 30 and closed cooling load loop 62 as previously discussed.

Figure 10:
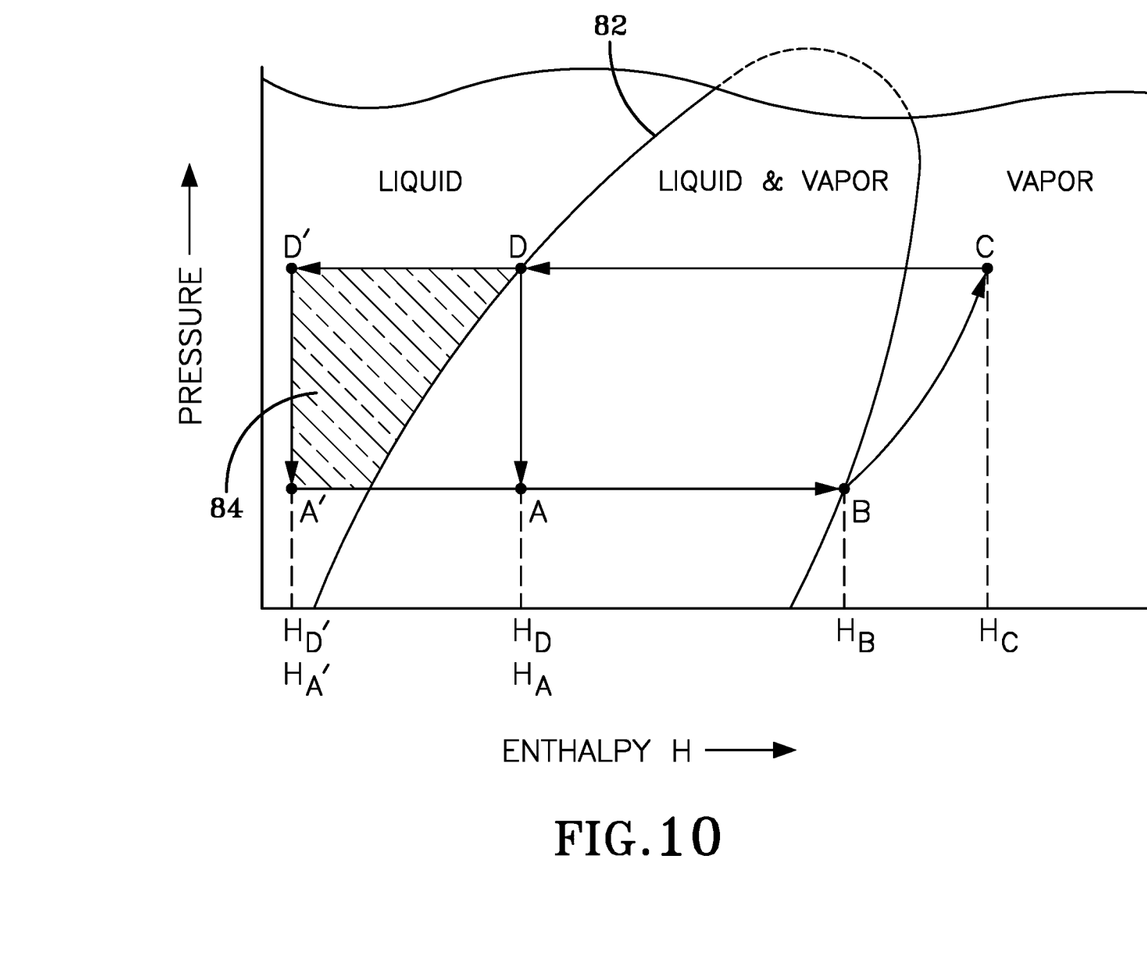
FIG. 10 graphically illustrates a pressure-enthalpy curve for an exemplary refrigerant corresponding to a process cycle in an exemplary vapor compression system.

FIG. 10 shows a well-known pressure-enthalpy curve 82 representative of different phases (vapor, liquid and vapor, and liquid) of a refrigerant at different combinations of pressure and enthalpy of closed refrigerant loops ABCD and A'BCD'. (Although A, A', B, C, D and D' are subscripts of enthalpy H, and normally expressed in a form such as $H_A$, only the subscripts by themselves are discussed below for purposes of clarity.) The closed refrigerant loop comprises a compressor 32, a condenser 34 and an evaporator 38 (FIG. 3) and graphically depicts a process cycle (compression (BC), condensation (CD) and (C'D'), expansion (DA) and (D'A'), and evaporation (A'B) and (AB)) of the refrigerant during operation of the loop relative to the pressure-enthalpy curve of the refrigerant. Closed refrigerant loop ABCD corresponds to a process cycle in which the refrigerant is either a vapor or liquid and vapor. Closed refrigerant loop A'BCD' corresponds to a process cycle in which the refrigerant is one of a vapor, liquid and vapor, or a liquid. Cross-hatched region 84 corresponds to a segment of the process cycle in which the refrigerant is a liquid, such that operating the process cycle in the cross-hatched region 84 would result in more efficient heat transfer. An exemplary method of the present disclosure comprises continuously operating the compressor 32 when a segment of the process cycle corresponds to the refrigerant being in the liquid phase (i.e., a segment of cross-hatched region 84). As further shown in FIG. 10, a segment of cross-hatched region 84 can include at least a portion of condensation of the refrigerant occurring during the process cycle. Similarly, a segment of cross-hatched region 84 can include at least a portion of evaporation of the refrigerant occurring during the process cycle. Alternately, as further shown in FIG. 10, a segment of cross-hatched region 84 can include at least a portion of each of evaporation and of condensation of the refrigerant occurring during the process cycle.

While only certain features and embodiments of the invention have been shown and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation-specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A chiller system, comprising:
   a compressor configured to circulate a refrigerant through a refrigerant circuit;
   a condenser configured to place the refrigerant in thermal communication with a cooling fluid;
   an evaporator configured to place the refrigerant in thermal communication with a working fluid; and
   a controller configured to:
   receive first sensor feedback indicative of a first temperature or pressure of the cooling fluid entering the condenser;
   receive second sensor feedback indicative of a second temperature or pressure of the working fluid exiting the evaporator;

continuously operate the compressor in response to the first sensor feedback being greater than the second sensor feedback; and operate the compressor during free-cooling conditions defined by the second sensor feedback being greater than the first sensor feedback.

2. The chiller system of claim 1, wherein the controller is configured to operate the compressor at a minimum speed during the free-cooling conditions defined by the second sensor feedback being greater than the first sensor feedback.

3. The chiller system of claim 1, wherein the controller is configured to continuously operate the compressor in response to the first sensor feedback and the second sensor feedback being substantially equal to one another.

4. The chiller system of claim 1, wherein the compressor is a positive displacement compressor or a centrifugal compressor.

5. The chiller system of claim 1, wherein the compressor comprises magnetic bearings.

6. The chiller system of claim 1, comprising a variable speed drive configured to adjust a rotational speed of a motor configured to drive the compressor.

7. The chiller system of claim 6, wherein the variable speed drive is configured to operate at 85 Hz to drive the compressor at a minimum speed during the free-cooling conditions.

8. The chiller system of claim 1, wherein the working fluid comprises water, ethylene glycol, propylene glycol, calcium chloride brine, sodium chloride brine, or any combination thereof.

9. The chiller system of claim 1, wherein the refrigerant comprises R-420A, R-408, R-134a, hydrofluoro olefin, ammonia, R-717, carbon dioxide, R-744, water vapor, or any combination thereof.

10. A chiller system configured to circulate a refrigerant through a refrigerant circuit and to place the refrigerant in thermal communication with a cooling fluid and with a working fluid, the chiller system comprising:

a first sensor configured to provide first feedback indicative of a first temperature or pressure of the cooling fluid entering a condenser of the chiller system;

a second sensor configured to provide second feedback indicative of a second temperature or pressure of the working fluid exiting an evaporator of the chiller system; and a controller communicatively coupled to the first sensor and the second sensor, wherein the controller is configured to continuously operate a compressor of the chiller system in response to the first feedback being less than the second feedback.

11. The chiller system of claim 10, wherein the chiller system is configured to subcool the refrigerant in at least a portion of the refrigerant circuit.

12. The chiller system of claim 10, comprising:

the condenser, wherein the condenser is configured to place the refrigerant in the thermal communication with the working fluid; and the evaporator, wherein the evaporator is configured to place the refrigerant in the thermal communication with the working fluid.

13. The chiller system of claim 10, comprising the compressor, wherein the compressor is a positive displacement compressor or a centrifugal compressor.

14. The chiller system of claim 10, comprising the compressor, wherein the compressor comprises magnetic bearings.

15. The chiller system of claim 10, wherein the controller is configured to adjust a rotational speed of the compressor via a variable speed drive.

16. The chiller system of claim 10, wherein the controller is configured to continuously operate the compressor to generate at least a minimum refrigerant flow rate through the refrigerant circuit to cool the working fluid by a target amount.

17. The chiller system of claim 10, wherein:

the working fluid comprises water, ethylene glycol, propylene glycol, calcium chloride brine, sodium chloride brine, or any combination thereof; and the refrigerant comprises R-420A, R-408, R-134a, hydrofluoro olefin, ammonia, R-717, carbon dioxide, R-744, water vapor, or any combination thereof.

18. A control system comprising memory configured to store instructions executable by a processor, wherein the instructions, when executed by the processor, cause the processor to:

receive first feedback indicative of a first fluid characteristic of a cooling fluid entering a condenser;

receive second feedback indicative of a second fluid characteristic of a working fluid exiting an evaporator;

compare the first feedback to the second feedback;

continuously operate a compressor in response to the first feedback being greater than the second feedback by a predetermined amount; and operate the compressor during free-cooling conditions defined by the second feedback being greater than the first feedback.

19. The control system of claim 18, wherein the first fluid characteristic of the cooling fluid entering the condenser comprises a first pressure of the cooling fluid entering the condenser, and wherein the second fluid characteristic of the working fluid exiting the evaporator comprises a second pressure of the working fluid exiting the evaporator.

20. The control system of claim 18, wherein the instructions, when executed by the processor, cause the processor to operate the compressor at a minimum speed during the free-cooling conditions.

* * * * *